(12) United States Patent
Kim et al.

(10) Patent No.: US 9,929,678 B2
(45) Date of Patent: Mar. 27, 2018

(54) ELECTROSTATIC ENERGY-HARVESTING DEVICE HAVING 3-DIMENSIONAL CONE SHAPE

(71) Applicant: RESEARCH & BUSINESS FOUNDATION SUNGKYUNKWAN UNIVERSITY, Suwon-si (KR)

(72) Inventors: Sang Woo Kim, Yongin-si (KR); Keun Young Lee, Suwon-si (KR); Seong Su Kim, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 387 days.

(21) Appl. No.: 14/592,266

(22) Filed: Jan. 8, 2015

(65) Prior Publication Data
US 2015/0222203 A1    Aug. 6, 2015

(30) Foreign Application Priority Data

Jan. 9, 2014   (KR) ......................... 10-2014-0003069

(51) Int. Cl.
| | | |
|---|---|---|
| *H02N 1/04* | (2006.01) | |
| *H02N 1/00* | (2006.01) | |
| *H02N 1/12* | (2006.01) | |

(52) U.S. Cl.
CPC ................ *H02N 1/04* (2013.01); *H02N 1/00* (2013.01); *H02N 1/002* (2013.01); *H02N 1/12* (2013.01)

(58) Field of Classification Search
CPC .. H02N 1/04; H02N 1/00; H02N 1/06; H02N 1/08; H02N 1/10; H02N 1/12; H02N 1/002

USPC .......................... 310/308, 309, 310
See application file for complete search history.

(56) References Cited

U.S. PATENT DOCUMENTS 8,519,596 B1    8/2013    Kim et al.
2013/0049531 A1    2/2013    Wang et al.

FOREIGN PATENT DOCUMENTS

KR    10-2010-0038183 A    4/2010
KR    20100038183 A    *    4/2010

OTHER PUBLICATIONS

Cha, Heui Jang; Cha Sol Bi; Cha Min Su, Generator Using Frictional Electricity, Apr. 13, 2010, KR 20100038183.*

* cited by examiner

*Primary Examiner* — Bernard Rojas
*Assistant Examiner* — Alexander Singh
(74) *Attorney, Agent, or Firm* — NSIP Law

(57) ABSTRACT

An electrostatic energy-harvesting device is provided. The electrostatic energy-harvesting device with a 3-dimensional cone shape includes a first structure including a first substrate having a cone shape with an opened lower surface and a hollow inside, and a first rubbing electrified body disposed on an outer surface of the first substrate; a second structure including a second substrate having the same shape as the first substrate and a second rubbing electrified body which includes a material having opposite electrification characteristics to the first rubbing electrified body and disposed on an inner surface of the second substrate; and leader lines connected to each of the first rubbing electrified body and the second rubbing electrified body.

7 Claims, 8 Drawing Sheets

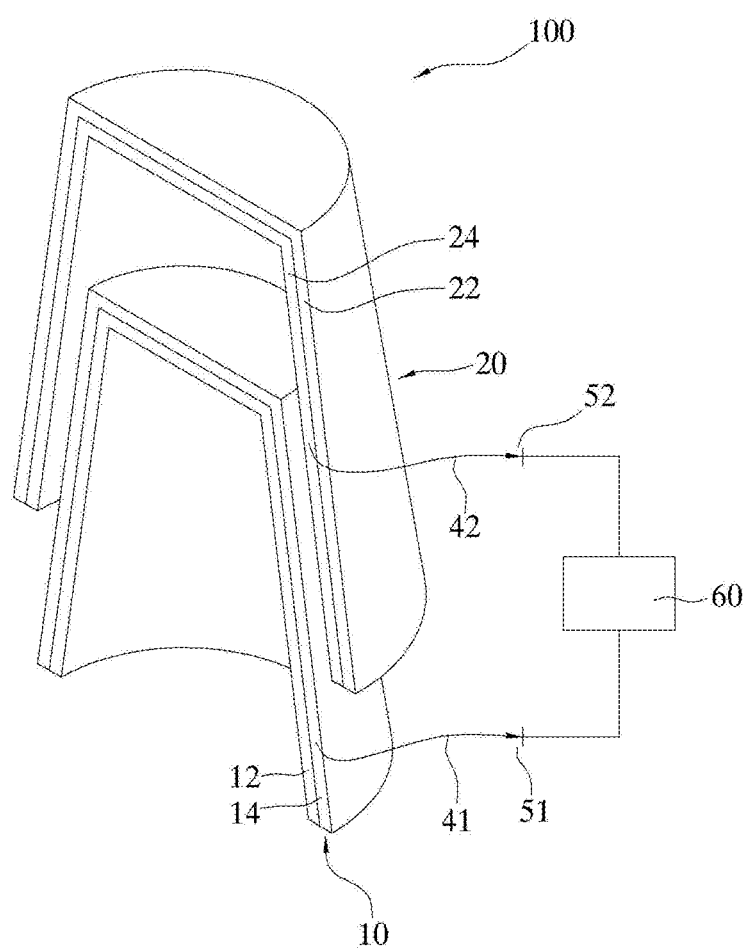
[figure 1]

【figure 2a】
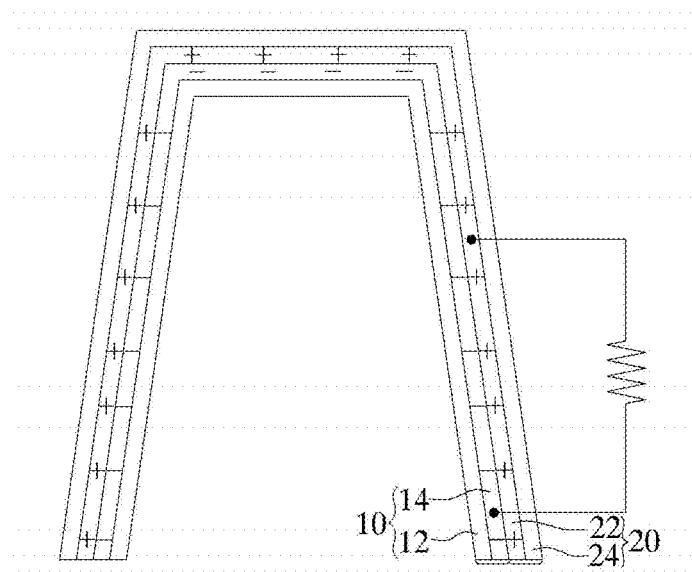

【figure 2b】
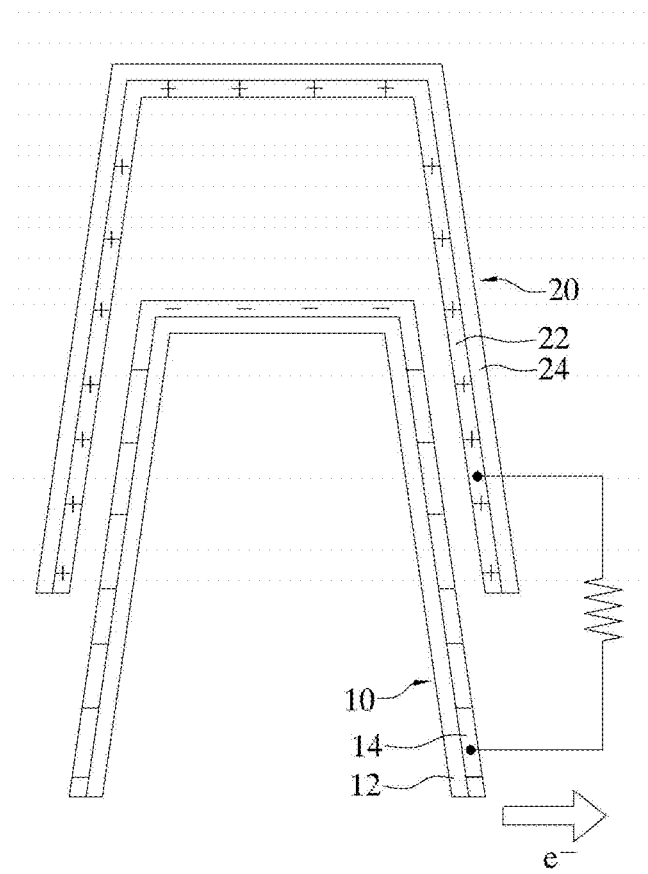

【figure 2c】
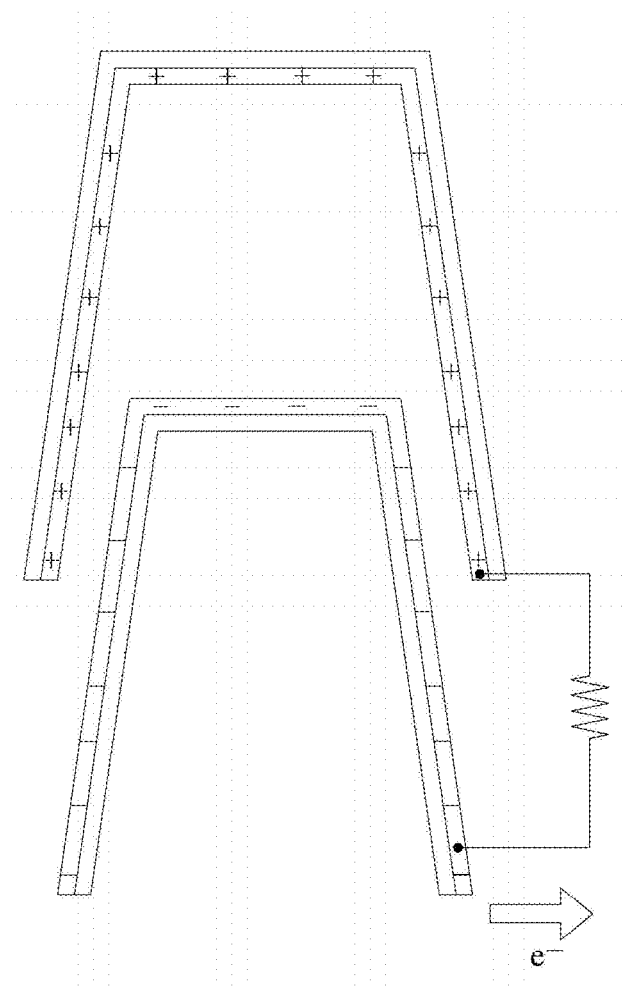

【figure 2d】
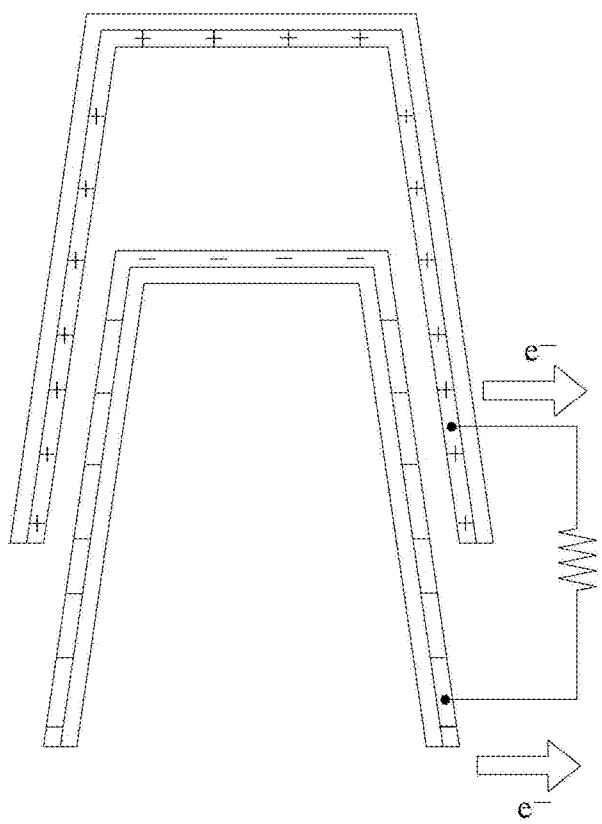

【figure 2e】
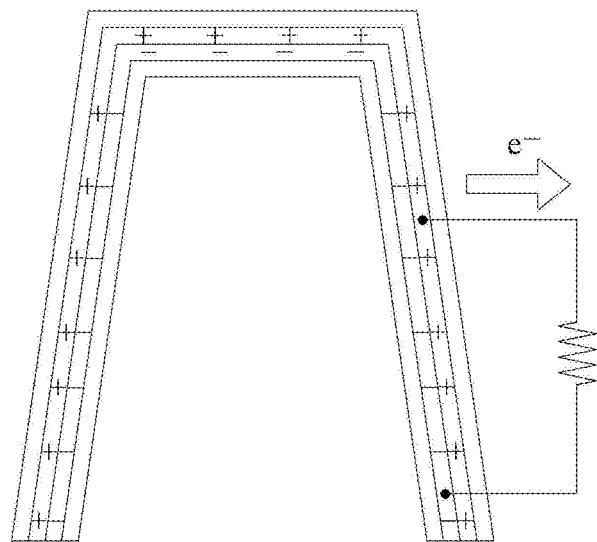

【figure 3】
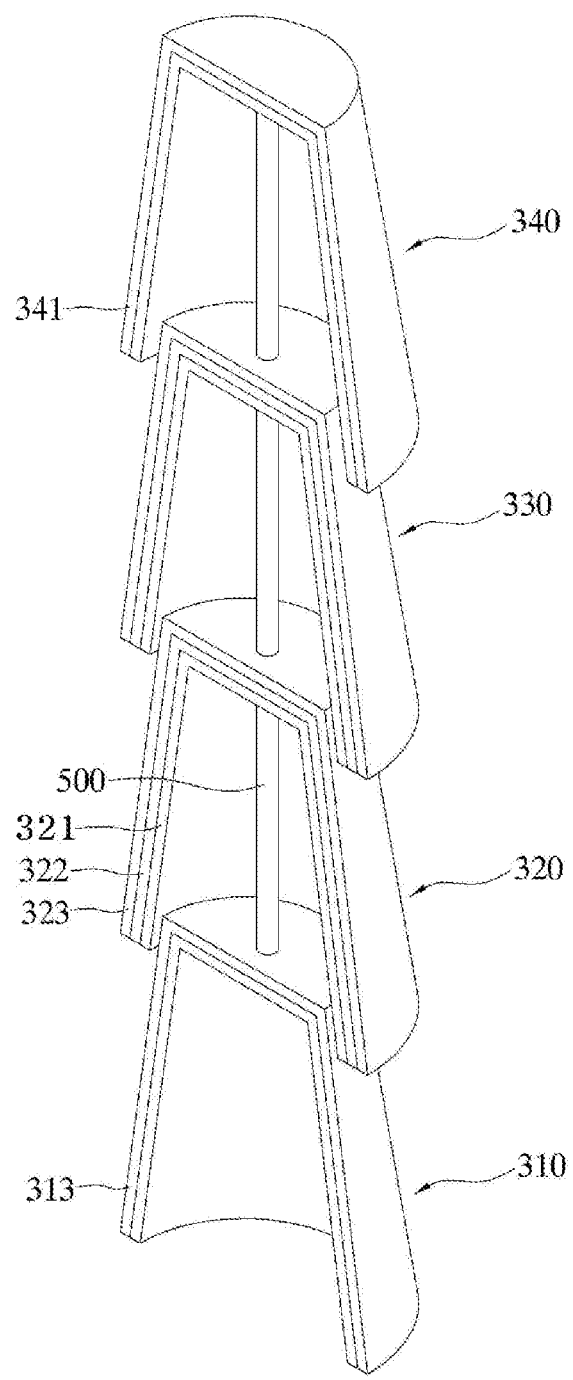

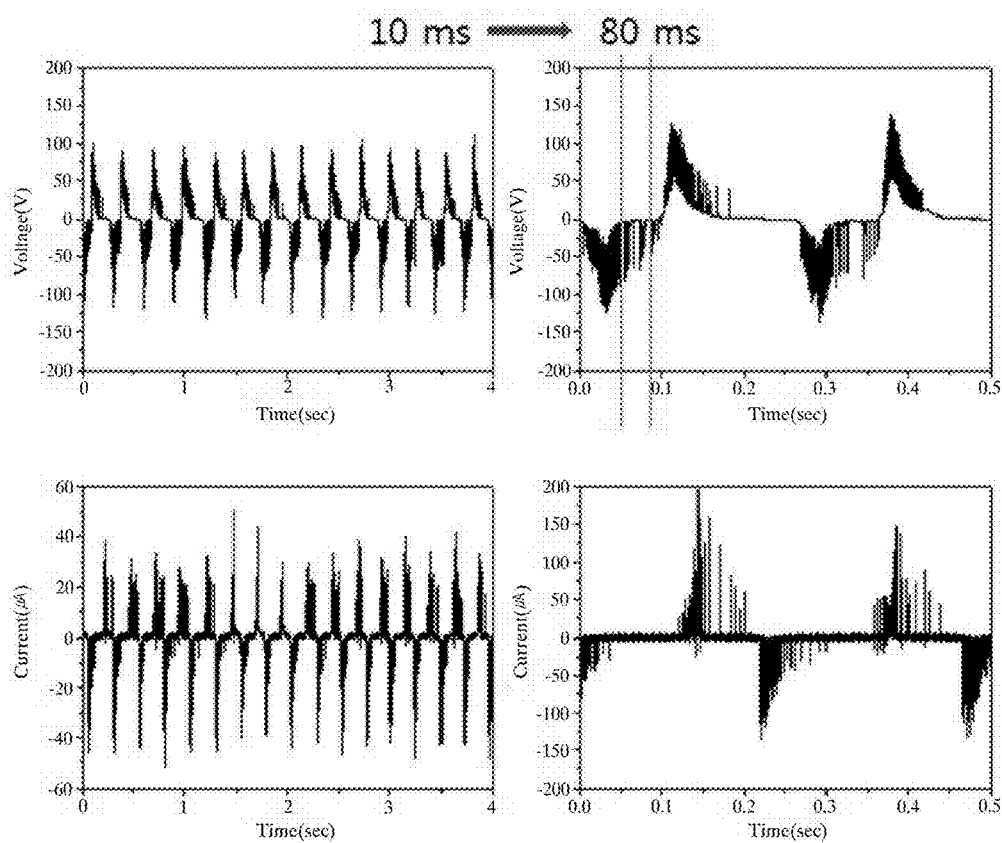
[figure 4]

ELECTROSTATIC ENERGY-HARVESTING DEVICE HAVING 3-DIMENSIONAL CONE SHAPE

CROSS-REFERENCE TO RELATED APPLICATION

This application claims priority to and the benefit of Korean Patent Application No. 2014-0003069, filed on Jan. 9, 2014, the disclosure of which is incorporated herein by reference in its entirety.

BACKGROUND

1. Field of the Invention

The present invention relates to an invention capable of greatly improving an output of "an electrostatic energy-harvesting device" by maintaining and amplifying an electrostatic effect generated by rubbing using a 3-dimensional cone shape.

2. Discussion of Related Art

"An electrostatic energy-harvesting device" which harvests energy using an electrostatic phenomenon generated by rubbing shows output characteristics in a waveform shape which are generated by an electrification difference when two objects come in contact and separate. The output of the electrostatic harvesting device is at a lower level than other energy-harvesting devices by a peak-peak output.

Unlike other types of eco-friendly energy such as that generated by solar cells, wind power, fuel cells, and the like, electrostatic energy is generated by an eco-friendly energy-harvesting device according to a new concept of limitlessly extracting ambient expendable mechanical energy generated from minute vibration or human motion as electric energy. Energy transformation methods using electrostatic characteristics have great transformation efficiency and are capable of being used by small and lightweight devices, and as such represent new technology making remarkable technical leaps through fusion with nano technology and are being evaluated as having a great ripple effect.

Recently, although interest in electrostatic energy-harvesting devices has been increasing, in an electrostatic energy-harvesting device using a conventional 2-dimensional thin film, a peak-peak output according to an electrification difference is shown when two objects in which an electrostatic phenomenon is to be generated come in contact or are rubbed together, and the energy generated thus is at a lower level than other energy generating devices, and thus research on methods of increasing output in electrostatic energy-harvesting devices is required.

PRIOR ART DOCUMENT

Korean Patent Laid Open Publications Nos. 10-2002-0050318 and 10-2012-0027468.

SUMMARY OF THE INVENTION

The present invention is directed to an invention for increasing output of an electrostatic energy-harvesting device.

One aspect of the present invention provides an electrostatic energy-harvesting device with a 3-dimensional cone shape, including: a first structure including a first substrate having a cone shape with an opened lower surface and a hollow inside, and a first rubbing electrified body disposed on an outer surface of the first substrate; a second structure including a second substrate having the same shape as the first substrate, and a second rubbing electrified body which includes a material having opposite electrification characteristics to the first rubbing electrified body and is disposed on an inner surface of the second substrate; and leader lines connected to each of the first rubbing electrified body and the second rubbing electrified body, wherein the second structure overlaps the first structure and is stacked on the first structure, triboelectricity is generated by contact therebetween, and electrostatic induction is generated by separation thereof.

A storage battery may be connected to the leader lines, and a rectification diode may be connected between the leader lines and the storage battery.

Another aspect of the present invention provides an electrostatic energy-harvesting device with a 3-dimensional cone shape, including: a plurality of stacked structures, each of the structures including a substrate having a cone shape with an opened lower surface and a hollow inside, a first rubbing electrified body disposed on an inner surface of the substrate, and a second rubbing electrified body including a material having opposite electrification characteristics to the first rubbing electrified body and disposed on an outer surface of the second substrate; leader lines connected to each of the first rubbing electrified body and the second rubbing electrified body of each of the structures; and a support configured to pass through the plurality of stacked structures along a vertical axis of the substrate of the cone shape and connect and support the plurality of stacked structures, and formed of a material without electrical conductivity, wherein the structures overlap and are stacked, triboelectricity is generated by contact therebetween, and electrostatic induction is generated by separation thereof.

Here, in the plurality of stacked structures, a second rubbing electrified body may be included only on an outer surface in a lowermost structure, and a first rubbing electrified body may be included only on an inner surface in an uppermost structure.

In this case, a storage battery may be connected to the leader lines, and a rectification diode may be connected between the leader lines and the storage battery.

BRIEF DESCRIPTION OF THE DRAWINGS

FIG. 1 is a perspective view illustrating an electrostatic energy-harvesting device with a 3-dimensional cone shape according to an embodiment of the present invention.

FIGS. 2A to 2E are views illustrating operating images of the electrostatic energy-harvesting device with the 3-dimensional cone shape according to the embodiment of the present invention.

FIG. 3 is a perspective view illustrating an electrostatic energy-harvesting device with a 3-dimensional cone shape having a shape of a stacked structure configured to generate electrostatic energy according to the embodiment of the present invention.

FIG. 4 is a view comparing an output peak of the electrostatic energy-harvesting device with the 3-dimensional cone shape according to the embodiment of the present invention with an output peak of a conventional electrostatic energy-harvesting device.

Various exemplary embodiments of the present invention will be described in detail hereinafter with reference to the accompany drawings, and like numerals refer to like elements throughout the description. Throughout the specification, various explanations will be presented such that the present invention may be understood. However, it is obvious that other embodiments can be embodied without such detailed explanation. In other embodiments, well known structures and devices are presented as block diagrams for convenience of explanation of the embodiments.

DETAILED DESCRIPTION OF EMBODIMENTS

The following explanations are simplified explanations of one or more embodiments that will provide basic understanding of embodiments of the present invention. The present section is not a comprehensive outline of all possible embodiments, and is not intended to determine core elements among all elements or to cover a scope of all embodiments. Its sole purpose is to provide a concept of one or more embodiments using simplified shapes as an introduction to the Detailed Description of Embodiments provided thereafter.

FIG. 1 is a perspective view illustrating an electrostatic energy-harvesting device with a 3-dimensional cone shape according to an embodiment of the present invention.

As shown in FIG. 1, an electrostatic energy-harvesting device 100 with a 3-dimensional cone shape according to the embodiment of the present invention includes a first structure 10, a second structure 20, and leader lines 41 and 42.

The first structure 10 includes a first substrate 12 and a first rubbing electrified body 14 disposed on an outer surface of the first substrate 12.

The first cone-shaped substrate 12 has an opened lower surface and a hollow inside, and the first rubbing electrified body 14 is attached on the outer surface of the first substrate 12.

The first substrate 12 functions to support the first rubbing electrified body 14, and a material thereof may be PEN, PET, PES, and the like, but is not limited thereto.

The first rubbing electrified body 14 is a portion from which static electricity is generated through contact with the second rubbing electrified body 24, and includes a material which is capable of being electrified into (+) or (−).

The second structure 20 also has a cone shape, and includes a second cone-shaped substrate 22, which has an opened lower surface and a hollow inside, and a second rubbing electrified body 24 attached to an inner surface of the second substrate 22.

The second substrate 22 functions to support the second rubbing electrified body 24, and a material thereof may be PEN, PET, PES, and the like, but is not limited thereto.

The second rubbing electrified body 24 may also include a material which may be electrified into (+) or (−) as a portion from which static electricity is generated through contact with the first rubbing electrified body 14. In this case, the second rubbing electrified body 24 may preferably include a material having opposite electrifying characteristics to the first rubbing electrified body 14.

The first structure 10 and the second structure 20 include lower surfaces of arbitrary cone-like shapes. By forming the cone-shaped structure, the electrostatic effect generated by the rubbing is continuously maintained by electrostatic induction, thereby increasing output.

As shown in FIG. 1, the second structure 20 is stacked on the first structure 10 and overlaps the first structure 10, and the first rubbing electrified body 14 of the first structure 10 comes in contact with the second rubbing electrified body 24 of the second structure 20 due to the stacking. Through the above contact, triboelectricity is generated.

In this case, the second structure 20 is stacked on and comes in contact with the first structure 10, and then is lifted up to separate the contact, generating electrostatic induction through the separation of the contact. The electrostatic induction will be explained in detail with reference to FIGS. 2A to 2E.

Meanwhile, the first rubbing electrified body 14 and the second rubbing electrified body 24 are connected to the leader lines 41 and 42, respectively. The leader lines are electrically connected to an energy storage part 60 such as a storage battery, and diodes 51 and 52 are inserted therebetween.

A load may be connected to the leader lines, which may directly light an electric bulb.

Here, the diode functions as a rectification diode through which a current flows in only one direction, and prevents current from flowing in an opposite direction, thereby preventing discharge of the energy storage part 60.

FIGS. 2A to 2E are views illustrating operating images of the electrostatic energy-harvesting device with the 3-dimensional cone shape according to the embodiment of the present invention.

FIG. 2A is a view illustrating the electrostatic energy-harvesting device with the 3-dimensional cone shape according to the embodiment of the present invention, and illustrates the first structure 10 stacked and in contact with the second structure 20.

The first structure 10 comes in contact with the second structure 20, and is rubbed, and thus one thereof is electrified into (+) and the other thereof is electrified into (−). In the embodiment of the present invention shown in FIGS. 2A to 2E, Al is used as the first rubbing electrified body 14, and PTFE is used as the second rubbing electrified body 24. Due to the electrification characteristics, the first rubbing electrified body 14 including Al is electrified into (−), and the second rubbing electrified body 24 including PTFE is electrified into (+). Due to the above electrification, a voltage difference is generated between the first rubbing electrified body 14 and the second rubbing electrified body 24, and the energy storage part 60 connected through the leader line is charged.

FIG. 2B is a view illustrating a separation state of the first structure 10 when the second structure 20 is lifted up, in which the contact is separated but electrostatic induction is generated at corresponding portions of the first rubbing electrified body 14 and the second rubbing electrified body 24 and where they are respectively charged into (−) and (+), and thus a triboelectric effect generated by the rubbing is maintained for a predetermined time due to the above electrostatic induction phenomenon.

FIG. 2C is a view illustrating the second structure 20 lifted up from the first structure 10 right before the second structure 20 completely separates from the first structure, and the electrostatic induction phenomenon is continuously generated, thereby maintaining the electrostatic effect.

FIG. 2D is a view illustrating the electrostatic induction phenomenon remaining when the second structure 20 is moved close the first structure 10 again, and finally, FIG. 2E illustrates the second structure 20 stacked on the first structure 10 again, thereby generating the electrostatic charge through rubbing.

As shown in FIGS. 2A to 2E, the electrostatic energy-harvesting device with the 3-dimensional cone shape according to the embodiment of the present invention is advantageous in maintaining the electrostatic effect generated by the electrostatic effect of the contact and by the rubbing for a predetermined time using the electrostatic induction phenomenon through the special cone structure even when the contact is separated.

Thus, the electrostatic energy-harvesting device with the 3-dimensional cone shape may not output a peak-peak output generated by an electrification difference when two objects in which an electrostatic phenomenon is to be generated come in contact or are rubbed together as mentioned in Discussion of Related Art, but may output an output that maintains a peak for a predetermined time, and the electrostatic effect generated by rubbing may eventually be maintained for a predetermined time and amplified, thus maintaining the output of the electrostatic energy-harvesting device and greatly increasing output. This may be verified with reference to the peaks shown in FIG. 4. In FIG. 4, the peak on the left side is a peak of a conventional general electrostatic energy-harvesting device which represents an output peak having a duration of about 10 ms, and the peak on the right side is a peak of the electrostatic energy-harvesting device according to the embodiment of the present invention which represents an output peak having a duration of about 80 ms.

FIG. 4 is a view comparing an output peak of the electrostatic energy-harvesting device with the 3-dimensional cone shape according to the embodiment of the present invention with an output peak of a conventional electrostatic energy-harvesting device.

In FIG. 4, Al is used as the first rubbing electrified body, and PTFE is used as the second rubbing electrified body.

As described in FIG. 4, in the electrostatic energy-harvesting device with the 3-dimensional cone shape according to the embodiment of the present invention, since the duration of the output peak is 80 ms, the output of the electrostatic energy-harvesting device remains constant, thereby greatly increasing the output.

FIG. 3 is a perspective view illustrating an electrostatic energy-harvesting device with a 3-dimensional cone shape having a shape of a stacked structure configured to generate electrostatic energy according to the embodiment of the present invention.

Hereinafter, matters already explained above will be omitted, and only new material will be explained.

A plurality of stacked structures 310, 320, 330, and 340 are illustrated in FIG. 3.

Each of the structures 320 and 330 includes a cone-shaped substrate 322 having an opened lower surface and a hollow inside, a first rubbing electrified body 321 disposed on an inner surface of the substrate 322, and a second rubbing electrified body 323 formed of a material having opposite electrification characteristics to the first rubbing electrified body 321 and disposed on an outer surface of the substrate 322.

Although not shown in the figures, leader lines are connected to each of the first rubbing electrified body and the second rubbing electrified body of each of the plurality of structures. An energy storage part such as a storage battery may be connected to the leader lines, or a diode may be inserted therein, and since this has already been described above, further explanation will be omitted.

Meanwhile, a second rubbing electrified body 313 is disposed on an outer surface of the structure 310 disposed at the lowermost part, and a first rubbing electrified body 341 is disposed on an inner surface of the structure 340 disposed at the uppermost part.

In the plurality of stacked structures, the number of the structures is not limited, the lowermost and uppermost structures preferably include the rubbing electrified bodies as the outer surface and the inner surface, respectively, and structures disposed in the center include rubbing electrified structures on both of an inner surface and an outer surface.

Meanwhile, a support 500 which connects and supports the plurality of structures is disposed. The support 500 that connects and supports the plurality of stacked structures passes through the plurality of stacked structures along a vertical axis of the cone-shaped substrates, and includes a material without electrical conductivity.

FIG. 3 illustrates an embodiment of the present invention in which a plurality of the electrostatic energy-harvesting devices with the 3-dimensional cone shapes according to the embodiment of the present invention shown in FIG. 1 are stacked, and thus output is further increased, and electric power generated from the structures is connected in series or in parallel, thereby greatly increasing the output.

An electrostatic energy-harvesting device with a 3-dimensional cone shape is advantageous in maintaining an electrostatic effect generated by an electrostatic effect caused by contact and rubbing using electrostatic induction even when the contact is separated. Thus, the electrostatic energy-harvesting device with the 3-dimensional cone shape may not output a peak-peak output generated by an electrification difference when two objects in which an electrostatic phenomenon is to be generated come in contact or are rubbed together as mentioned in Discussion of Related Art, but may output an output maintaining a peak for a predetermined time, and the electrostatic effect generated by rubbing may eventually be maintained for a predetermined time and amplified, and thus the output of the electrostatic energy-harvesting device is maintained and the output greatly increased.

The present invention has been explained with reference to the exemplary embodiments, however, it will be apparent to those skilled in the art that various modifications can be made to the above-described exemplary embodiments of the present invention without departing from the spirit or scope of the invention. Here, the essential technical scope of the present invention is disclosed in the appended claims, and it is intended that the present invention cover all such modifications provided they come within the scope of the claims and their equivalents.

What is claimed is:

1. An electrostatic energy-harvesting device with a 3-dimensional cone shape, comprising:
   a first structure comprising
      a first substrate, and
      a first rubbing electrified body disposed on a first surface of the first substrate, the first substrate being in shape of a conical shell with a second surface and a hollow inside, the first surface being on an outside of the conical shell of the first substrate and the second surface being on an inside of the conical shell of the first substrate;
   a second structure comprising
      a second substrate having the same shape as the first substrate, and having a third surface and a fourth surface, and
      a second rubbing electrified body which includes a material having opposite electrification characteristics to the first rubbing electrified body and is disposed on the fourth surface of the second substrate and is configured to face an outside surface of the first rubbing electrified body, wherein the third surface is on an outside of the second substrate and the fourth surface is on an inside of the second substrate; and
   leader lines connected to each of the first rubbing electrified body and the second rubbing electrified body, wherein the second structure overlaps the first structure and is stacked on the first structure, triboelectricity is generated by contact therebetween, and electrostatic induction is generated by separation thereof.

2. The electrostatic energy-harvesting device of claim 1, wherein a storage battery is connected to the leader lines.

3. The electrostatic energy-harvesting device of claim 2, wherein a rectification diode is connected between the leader lines and the storage battery.

4. An electrostatic energy-harvesting device with a 3-dimensional cone shape comprising:
   a plurality of stacked structures, each of the structures including a substrate having a cone shape with an opened lower surface and a hollow inside, a first rubbing electrified body disposed on an inner surface of the substrate, and a second rubbing electrified body including a material having opposite electrification characteristics to the first rubbing electrified body and disposed on an outer surface of the second substrate;
   leader lines connected to each of the first rubbing electrified body and the second rubbing electrified body of each of the structures; and
   a support configured to pass through the plurality of stacked structures along a vertical axis of the substrate having the cone shape and connect and support the plurality of stacked structures, and formed of a material without electrical conductivity,
   wherein the structures overlap and are stacked, triboelectricity is generated by contact therebetween, and electrostatic induction is generated by separation thereof.

5. The electrostatic energy-harvesting device of claim 4, wherein, in the plurality of stacked structures, the second rubbing electrified body is included only on an outer surface in a lowermost structure, and the first rubbing electrified body is included only on an inner surface in an uppermost structure.

6. The electrostatic energy-harvesting device of claim 4, wherein a storage battery is connected to the leader lines.

7. The electrostatic energy-harvesting device of claim 4, wherein a rectification diode is connected between the leader lines and the storage battery.

* * * * *